United States Patent [19]
Scott et al.

[11] Patent Number: 4,963,065
[45] Date of Patent: Oct. 16, 1990

[54] CENTRIFUGAL PUMP FOR PULVERIZED MATERIAL

[75] Inventors: Andrew M. Scott; Bernardus B. Quist; Teunis Terlouw, all of Amsterdam, Netherlands

[73] Assignee: Shell Oil Company, Houston, Tex.

[21] Appl. No.: 839,832

[22] Filed: Mar. 14, 1986

Related U.S. Application Data

[60] Division of Ser. No. 746,441, Jun. 18, 1985, Pat. No. 4,605,352, which is a division of Ser. No. 699,494, Feb. 8, 1985, abandoned, which is a continuation of Ser. No. 435,011, Oct. 18, 1982, abandoned.

[30] Foreign Application Priority Data

Nov. 20, 1981 [GB] United Kingdom .............. 8135066

[51] Int. Cl.$^5$ ............................................ B65G 53/40
[52] U.S. Cl. ............................ 414/217; 239/214.25; 239/418; 406/71
[58] Field of Search .............. 414/217, 195, 205, 206, 414/301; 406/71; 239/214, 214.25, 222.13, 225, 231, 380, 418, 433, 504, 516, 519

[56] References Cited

U.S. PATENT DOCUMENTS

| | | | |
|---|---|---|---|
| 1,289,779 | 12/1918 | Howard | 239/418 X |
| 2,998,230 | 8/1961 | Perretti | 239/214.25 X |
| 3,130,252 | 4/1964 | Metz | 239/418 |
| 4,265,580 | 5/1981 | Meyer | 414/217 |
| 4,362,441 | 12/1982 | Meyer et al. | 414/217 X |
| 4,376,608 | 3/1983 | Meyer et al. | 414/217 |

FOREIGN PATENT DOCUMENTS

2816316  12/1978  Fed. Rep. of Germany ...... 414/217

*Primary Examiner*—Frank E. Werner

[57] ABSTRACT

A centrifugal pump for feeding pulverized material such as coal particles from a low pressure zone into a high pressure zone, said pump having nozzles mounted on a rotor. The pulverized material is ejected into the high pressure space through the nozzles, and gas is supplied to the nozzles to control the flow rate of the pulverized material. Devices are provided that ensure mass flow of the material through the nozzles, even if the nozzles have a short length.

3 Claims, 2 Drawing Sheets

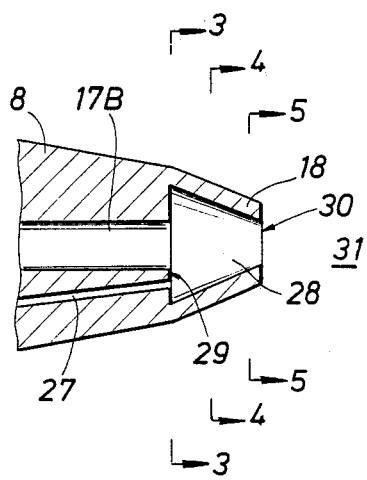
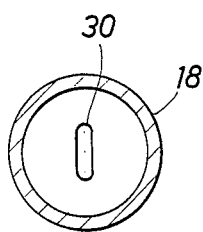
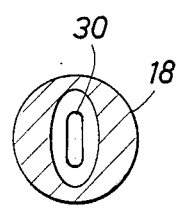
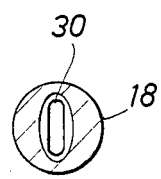
FIG.2  FIG.3  FIG.4  FIG.5
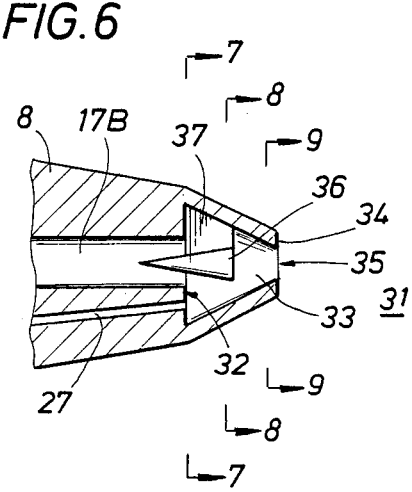
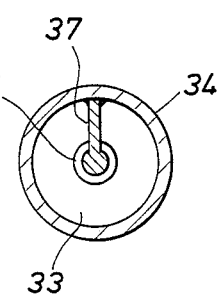
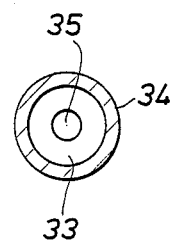
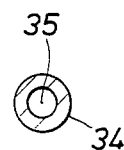
FIG.6  FIG.7  FIG.8  FIG.9
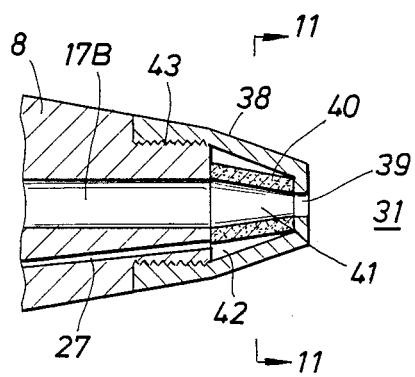
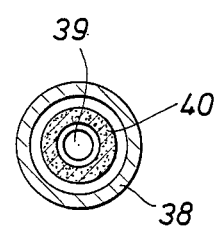
FIG.10  FIG.11

CENTRIFUGAL PUMP FOR PULVERIZED MATERIAL

This is a division of application Ser. No. 746,441 filed June 18, 1985, which is now U.S. Pat. No. 4,605,352, which is a division of application Ser. No. 699,494 filed Feb. 8, 1985, now abandoned, which is a continuation of application Ser. No. 495,011 filed Nov. 18, 1982, now abandoned.

BACKGROUND OF THE INVENTION

The present invention relates to a centrifugal pump for feeding pulverized material from a low pressure zone into a high pressure zone. In particular, the present invention relates to a centrifugal pump for pulverized material that includes a hollow rotor with a central chamber communicating with a plurality of channels extending toward the outer rim of the rotor, each channel communicating at the outlet thereof with a nozzle.

Such centrifugal pumps are used for feeding pulverized material, such as coal particles, and granulated reactants and/or catalysts into vessels such as furnaces and reactors wherein the pressure of the gas present therin is higher than the pressure in the space from which the pulverized material is to be transferred into the vessel.

Processes wherein centrifugal pumps for pulverized material may find useful application are, for example, coal gasification, coal combustion under pressure, supercritical gas extraction, iron ore reduction with solid fuel injection, feeding of catalyst to a catalyst cracking unit, and feeding of limestone or dolomite to a sulphur removal installation under pressure.

In operation, the outlet of the centrifugal pump communicates with a space wherein a high gas pressure prevails. The pulverized material that is to be introduced into this space, is supplied to the central chamber of the hollow rotor of the pump. Under the influence of the centrifugal forces exerted by the rotating rotor on the pulverized material, the material is displaced outward at great force and enters the channels leading to the outer rim of the rotor. Such channels may be placed radially with respect to the center of the rotor and have a cross-sectional area that changes in radial direction from a rectangular shape to a circular shape. The pulverized material is ejected from each channel into the high pressure space via a nozzle that is carried by the rotor and placed coaxially to the channel with which it cooperates.

A centrifugal pump of the above-described type is known from PCT patent application No. W 80/00407 in the name of Lockheed Missiles & Space Co. Inc. (filed Apr. 10, 1980, published Nov. 13, 1980). The feed rate of the material through the nozzles of the centrifugal pump described in this publication is controllable by controlling a supply of gas under pressure to the interior of the nozzle.

The material flow through the nozzles is in the form of mass flow. In this type of flow, these are no stagnant zones, and movement of the particles at the outlet of the nozzles implies movement of all other particles present in the nozzles. The interior of each nozzle through which mass flow takes place is of frusto-conical shape, and the apex angle of the cone of which the frusto-cone forms part is relatively small. Consequently, the length of the cone is relatively large.

In view of the extremely high rotational speeds at which the rotors of centrifugal pumps for pulverized material are operated, it is desirable to decrease the overall diameter of such rotors, since such decrease in diameter will result in lower energy consumption of the electric motors that drive the pump rotors.

It has been found, however, that shortening the length of the nozzles to obtain a rotor with relatively small diameter, negatively influences the control of the flow rate of the material through the nozzles.

SUMMARY OF THE INVENTION

A purpose of the present invention is to design nozzles for a centrifugal pump for pulverized material, which do not show the above drawback of the prior art.

According to the invention, a centrifugal pump for continuously feeding pulverized material from a low pressure zone into a high pressure zone includes a hollow rotor with a central chamber communicating with a plurality of channels extending toward the outer rim of the rotor, each channel communicating at the outlet thereof with a nozzle and the interior of each nozzle communicating with a conduit for the supply of gas, the interior of each nozzle being frusto-conically shaped, and each nozzle being connected to the rotor in a manner allowing vibration of the nozzle with respect to the rotor.

According to another aspect of the invention, a centrifugal pump for continuously feeding pulverized material from a low pressure zone into a high pressure zone includes a hollow rotor with a central chamber communicating with a plurality of channels extending toward the outer rim of the rotor, each channel communicating with a nozzle, and the interior of each nozzle communicating with a conduit for the supply of gas, wherin the interior of each nozzle is formed as a wedge-shaped cone, the cylindrical bottom end of the cone-shaped interior communicating with the outlet of a channel and being coaxial therewith, and the open slit-like top portion of the cone-shaped interior communicating with the high pressure zone.

According to still another aspect of the invention, a centrifugal pump for continuously feeding pulverized material from a low pressure zone into a high pressure zone includes a hollow rotor with a central chamber communicating with a plurality of channels extending toward the outer rim of the rotor, each channel communicating with a nozzle, the interior of each nozzle being formed as a truncated cone which communicates at the cylindrical bottom end thereof with the outlet of a channel, and at the other end thereof via a circular opening with the high pressure zone, the central axes of the outlet and the opening coinciding, wherein the interior of each nozzle communicates with a conduit for the supply of gas, and a conical insert body is placed coaxially with respect to the cone-shaped interior of the nozzle, the apex of the conical insert body being located within the channel and the remaining part of the body being located within the interior of the nozzle.

According to still another aspect of the invention, a centrifugal pump for continuously feeding pulverized material from a low pressure zone into a high pressure zone includes a hollow rotor with a central chamber communicating with a plurality of channels extending toward the outer rim of the rotor, each channel communicating with a nozzle, the interior of each nozzle being formed as a truncated cone which communicates at the bottom end thereof with the outlet of a channel, and at the other end thereof via the circular opening with the high pressure zone, the central axes of the outlet and the opening coinciding, and wherein further a conically shaped permeable wall is arranged coaxially with respect to the circular opening, which wall extends from the outlet of the channel to the circular opening of the nozzle, the space between the permeable wall and the wall of the interior of the nozzle communicating with a conduit for the supply of gas. The wall may be made of a porous material, or may be provided with notch-shaped openings.

The centrifugal pumps according to the invention can be operated at high speeds at relatively low energy consumption without sacrificing the flexibility of the feed rate of pulverized material therethrough.

BRIEF DESCRIPTION OF THE DRAWINGS

The invention will hereinafter be described by way of example in more detail. Reference is made to the drawings, wherein:

FIG. 2 shows details of a nozzle 18 of the pump of FIG. 1, but on a scale larger than the scale of FIG. 1, and FIGS. 3, 4 and 5 show cross sections of the nozzle of FIG. 2, taken across lines III—III, IV—IV, and V—IV, respectively.

FIG. 6 shows a first alternative of the nozzle of FIG. 2, and

FIGS. 7, 8 and 9 show cross sections of the nozzle of FIG. 6, taken across lines, VII—VII, VIII—VIII, and IX—IX, respectively.

FIG. 10 shows a second alternative of the nozzle of FIG. 2, and

FIG. 11 shows a cross section of the nozzle of FIG. 10 taken across the line XI—XI.

DESCRIPTION OF PREFERRED EMBODIMENTS

All the nozzles shown in FIGS. 2, 6, 10, 12 and 13 are of a length that is relatively small compared to the length of the nozzles in prior art pumps, and are designed to allow mass flow of pulverized material through the nozzle over a wide range of feed rates thereof.

Figure 1:
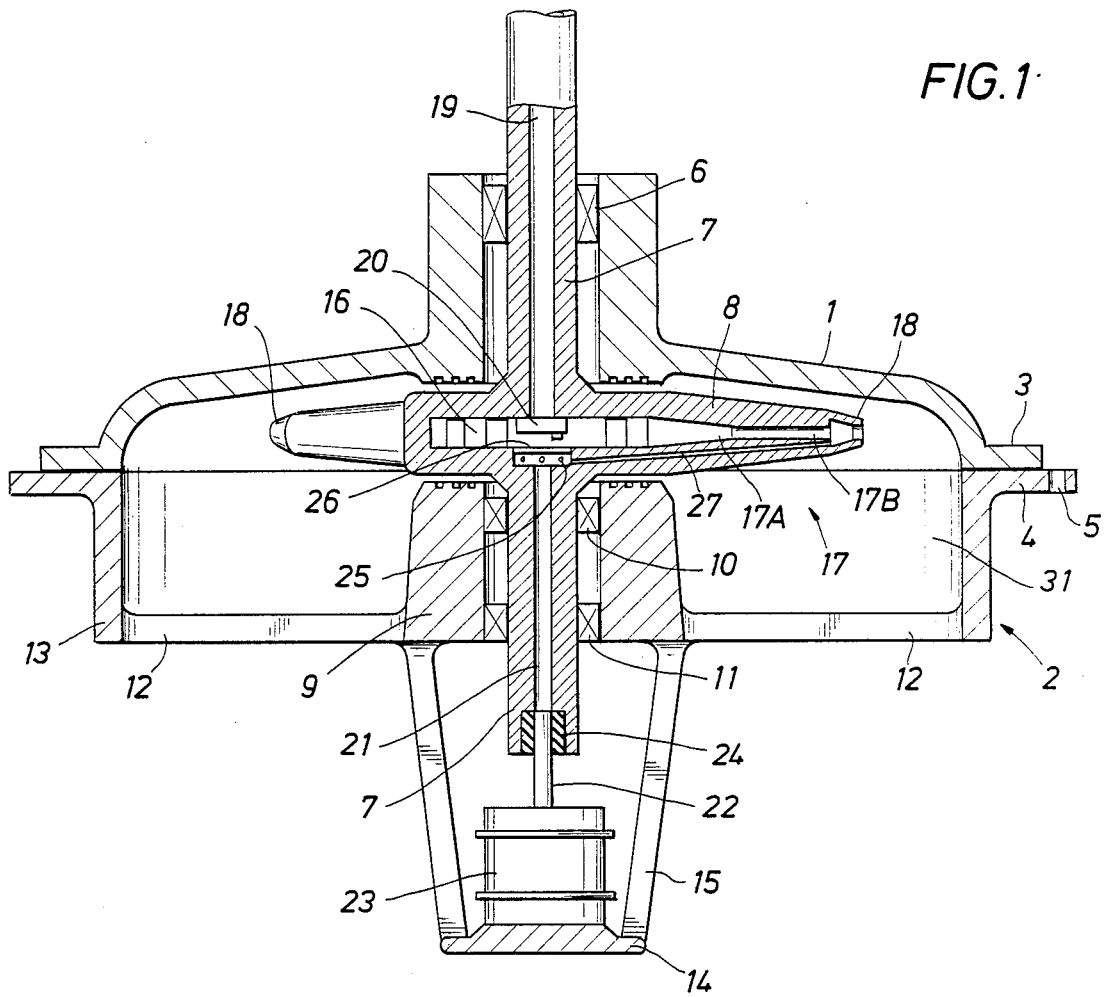
FIG. 1 shows schematically a longitudinal section over a centrifugal pump according to the invention, which pump is in particular suitable for feeding fine coal particles into a pressurized vessel.

FIG. 1 shows schematically of longitudinal section over a coal pump that is provided with a housing consisting of two parts 1 and 2, the parts 1 and 2 being provided with flanges 3, 4, respectively, for interconnecting the housing parts in a suitable manner (not shown). The flange 4 of the lower part 2 of the housing is provided with holes 5 allowing the housing of the pump to be mounted in an opening (not shown) of the wall of a pressurized vessel (not shown).

The upper part 1 of the pump housing carries a bearing 6 supporting the upper part of the shaft 7 of the centrifugal rotor 8. The central body 9 of the lower part 2 of the pump housing carries two bearings 10 and 11 supporting the lower part of the shaft 7 of the rotor 8. It will be appreciated that suitable bearings to be used as bearings 6, 10 and 11 are known per se, and therefore these bearings do not require any detailed description. The same applies for the sealing means (not shown) to be used in combination with the bearings.

The central body 9 of the pump housing is supported by arms 12 that connect the body 9 to the skirt 13 of the lower part 2 of the housing of the pump. The central body 9 carries the support 14 by means of arms 15 extending downward from the body.

The centrifugal rotor 8 of the pump is hollow and comprises a central chamber 16 and a plurality of channels 17 extending radially from the chamber 16. Each channel consists of a conical part 17A and a cylindrical part 17B. The conical part has a square cross section at the end thereof communicating with the central chamber 16 and a circular cross section at the other end thereof where it communicates with a cylindrical part 17B of the channel 17.

The other end of the cylindrical part 17B of each channel 17 communicates with a nozzle 18 that will be described hereinafter in greater detail with reference to FIGS. 2–5 of the drawings.

The upper part of the shaft 7 carrying the rotor 8 is hollow and the conduit 19 thus formed therein cooperates at the lower end thereof with a distributor element 20 that guides coal particles passing through the conduit 19 in radial directions when entering the central chamaber 16 of the rotor 8.

The upper end of the upper part of the shaft 7 is connected to a drive motor (not shown), which actuates the shaft to drive the rotor 8 at high speed. Further, means (not shown) are provided to supply coal particles via the conduit 19 in the shaft 7 to the central chamber 16 of the rotor 8.

The lower part of the shaft 7 carrying the rotor 8 is also hollow, and the conduit 21 thus formed communicates at the lower end thereof with the outlet 22 of a gas compressor unit 23 mounted on the support 14. Sealing means 24 are provided to allow rotation of the shaft 7 with respect to the immobile outlet 22 of the compressor unit 23. Compressed gas from the compressor unit 23 is passed on via the conduit 21 into the space 25 that is separated from the central chamber 16 of the rotor 8 by means of a wall 26. Conduits 27 extend from the space 25 to the nozzles 18 to supply the compressed gas thereto.

Reference is now made to nozzle 18 shown in detail in FIGS. 2–5. The interior 28 of the nozzle 18 is formed as a wedge-shaped cone. The bottom end 29 of the cone-shaped interior 28 communicates with the cylindrical outlet of the channel 17B. The open slit-like top 30 of the cone-shaped interior 28 communicates with the high pressure zone 31 (see also FIG. 1) inside the housing of the pump.

During operation of the centrifugal pump, the rotor 8 is driven at high speed means of an electric motor (not shown) actuating the shaft 7. Simultaneously, the compressor unit 23 is in operation to supply gas under a pressure above the pressure prevailing in the space 31, to the interiors 28 of the nozzles 18.

Coal particles are supplied from an atmospheric feed hopper (not shown) to the top of the conduit 19 and enter the central chamber 16 of the rotor 8. Subsequently, the particles are forced through the channels 17 under the influence of centrifugal forces acting thereon, and pass into the nozzles 18 from which they are ejected into the space 31. When the pump is mounted in an opening of a wall of a high pressure vessel, a high pressure will prevail in the space 31. By the action of the pump, the coal particles are transferred from a low pressure space (the atmospheric feed hopper) to a high pressure space (the interior of the high pressure vessel).

The coal particles that flow through the nozzle 18 pass through the space 28 in the form of mass flow. The rate of such flow is controllable by varying the supply rate of compressed gas that is supplied to the interior 28 of the nozzle 18 via the conduit 27. The supply rate of the gas can be varied in a known manner, such as by controlling the speed of the compressor unit 23. The conically wedge-shaped form of the space 28 ensures mass flow even at short lengths of the nozzle. Whereas at a given relatively short length, the use of a conically shaped interior of the nozzle would result in a so-called funnel-flow of the particles through the interior of the nozzle, which type of flow—as has been found by Applicant—cannot be controlled as regards the flow rate by varying the supply rate of the gas via the conduit 27, the present conically wedge-shaped interior of the nozzle ensures mass flow of the coal particles and consequently allows control of the rate at which they are allowed to pass through the nozzle interior.

The invention is not restricted to the use of nozzles having a conically wedge-shaped interior as described with reference to FIGS. 2–5 of the drawings. Nozzles having an interior in the form of a symmetric truncated cone with relatively small height may also be used, but then the desired mass flow of the coal particles therethrough is obtained by applying a conical insert body in the interior of the nozzle. This embodiment of the invention is shown in FIGS. 6–9 of the drawings. The interior 33 of the nozzle 34 has the shape of a symmetric truncated cone, and the bottom end 32 thereof communicates with the cylindrical outlet of the channel 17B. The open top end 35 of the interior 33 communicates with the high pressure zone 31. The conical insert body 36 is arranged coaxially in the channel 17B and the interior 33 of the nozzle 34. The body 36 is supported via the member 37 by the inner wall of the nozzle 34 and is located with the apex end thereof within the channel 17B and with the remaining part thereof within the interior 33 of the nozzle 34. The interior 33 communicates via the conduits 27 and 21 and the chamber 25 (see also FIG. 1) with the outlet 22 of the compressor unit 23. The rate of the feed of coal particles into the space 31 is controlled by varying the supply rate of gas via the conduit 27 to the interior 33 of the nozzle.

FIGS. 10 and 11 show another alternative of the nozzle 18 of the pump of FIG. 1. The interior of the nozzle 38 communicates at one end thereof with the circular outlet of the channel 17B, and at the other end thereof with a circular opening 39 that opens up to the high pressure zone 31. The central axes of the cylindrical channel 17B and the circular opening 39 coincide.

A conical permeable body 40 made of wear-resistant porous material has been placed in the interior of the nozzle 38 and coaxially to the channel 17B and the opening 39. The body 40 divides the interior of the nozzle 38 into two compartments. One compartment 41 communicates directly with the channel 17B and the opening 39, and the other compartment 42 communicates directly with the conduit 27 via which compressed gas is supplied to the nozzle 38. The nozzle 38 is provided with a screw-thread 43 to allow mounting of the permeable body 40 in the interior of the nozzle. The gas that is supplied to the compartment 42 passes through the permeable porous wall 40 and by adjusting the rate of the gas supply, the feed rate of coal particles through the nozzle 38 is controlled. The use of the porous wall 40 in the interior of the nozzle 38 ensures mass flow of the coal particles through the nozzle, even if this nozzle is of relatively short length. By varying the rate of gas supply to the space 42, the rate at which the coal particles pass through the interior of the porous mantle 40 can be controlled.

Figure 12:
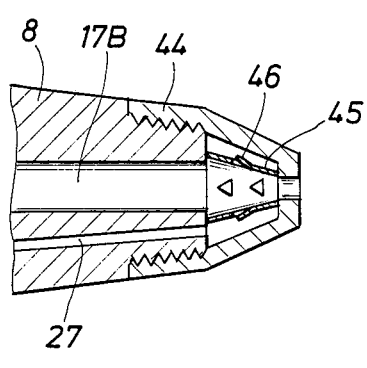
FIG. 12 is a fourth alternative of the nozzle of FIG. 2.

Reference is now made to FIG. 12 showing a nozzle 44 provided with a permeable conical body 45 consisting of a truncated cone made of metal sheet provided with a plurality of notch-shaped openings 46 distributed over the surface thereof. This nozzle is operated in the same manner as the nozzle shown in FIG. 10.

It will be appreciated that although the wall of the interior of the nozzles 38 and 44 (see FIGS. 10 and 12, respectively) is shown to be conical, other shapes may be applied as well, since the shape of the compartment outside the conical permeable bodies 40 and 45 has no influence on the distribution of the gas through the walls, as long as the cross section of the compartment is sufficient to allow the required volume of gas to pass therethrough.

Figure 13:
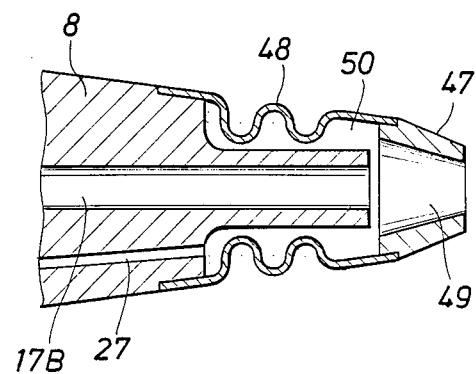
FIG. 13 shows a fifth alternative of the nozzle of FIG. 2.

Finally, reference is made to the nozzle 47 shown in FIG. 13. This nozzle 47 is connected to the rotor by means of a bellow 48, which is connected at the ends thereof to the rotor 8 and to the nozzle 47 is a suitable fluid-tight manner, such as by soldering. During operation of the centrifugal pump, coal particles are passing from the channel 17B into the frusto-conical interior 49 of the nozzle 47. The speed at which the coal particles pass through the nozzle 47 is controlled by the amount of pressurized gas that passes from the conduit 27 via the space 50 into the interior 49 of the nozzle 47. Since the bellows 48 are flexible, the nozzle 47 is subjected to a slight vibration during the rotation of the rotor 8, which ensures the flow of coal particles through the interior 49 of the nozzle 47 in the form of mass flow. The vibration of the rotor of the pump is often sufficient to generate the required vibration of the nozzle. If this vibration is insufficient, vibration generating means may be mounted on the nozzles and/or on the rotor.

It will be appreciated that the invention is not restricted to any particular shape of the rotor 8. Although the rotor shown in FIG. 1 has radially extending arms enclosing the channels 17, other forms of the rotor may also be used. Thus, the rotor 8 may be in the form of a disc, wherein the channels 17 extend, which channels communicate With nozzles that are mounted on the outer cylindrical rim of the disc-shaped rotor.

What is claimed is:

1. A centrifugal pump for continuously feeding pulverized material from a low pressure zone into a high pressure zone, the pump comprising a hollow rotor with a central chamber communicating with a plurality of channels extending toward the outer rim of the rotor, each channel communicating at the outlet thereof with a nozzle, the interior of each nozzle communicating at the bottom end thereof with the outlet of a channel, and at the other end thereof, via a circular opening with the high pressure zone, the central axes of the outlet and the opening coinciding, and a conically shaped wall of continuous porosity being arranged coaxially with respect to the circular opening, which wall extends form the outlet of the channel to the circular opening of the nozzle, the space between the wall of continuous porosity and the wall of the interior of the nozzle communicating with a conduit for the supply of gas.

2. A centrifugal pump according to claim 1 wherein the permeable wall is a porous material.

3. A centrifugal pump according to claim 1 wherein the permeable wall is provided with notch-shaped openings.

* * * * *